9115X
E. DABOLL.
Cooking Stove.
No Printed Specification Ay
Patented Sept. 26, 1835.
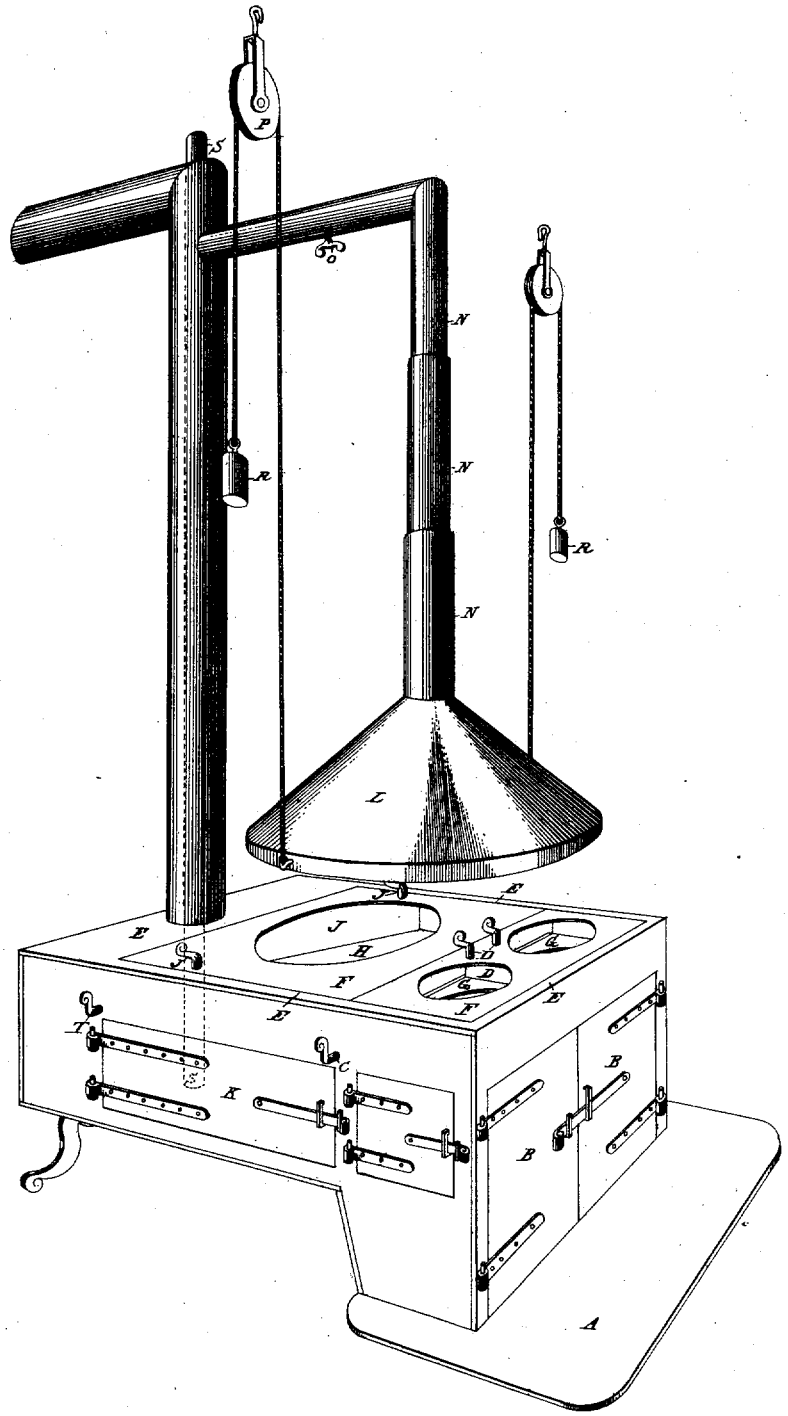
N. PETERS, Photo-Lithographer, Washington, D. C.

Sept. 26. 1835 9115X 29

9-26-1835

Ezekiel Daball of Canaan Connecticut.

Letters Patent.

The schedule referred to in these Letters Patent and making part of the same containing a description in the words of the said Ezekiel Daball himself of his improvement in the Cooking Stove ——

To all to whom these presents shall come

Be it known that I Ezekiel Daball of the Town of Canaan in the County of Litchfield and State of Connecticut, have invented a new and useful cooking stove, and that the following is a just description thereof, 1, The general description of the stove is this. The stove is made wholly of cast iron, the front part is upright, the back part, is horizontal In the upright or front part is placed the fuel, the horizontal part contains an oven the top plate of the stove which extends over the whole stove both upright and horizontal contains orifices for receiving cooking utensils and in both the upright and horizontal parts are placed moveable dampers, and a plate for concentrating the heat in any part of the stove where it may be needed. The oven is directly back of the fire place, and the lower plate of the horizontal part is raised considerably higher above the floor than the hearth of the upright part. The fire is conveyed around the oven in the common manner of a diving flue.

2d. The upright part stands upon a hearth which is raised about three inches from the floor. There is a fire place in the upright part having one or more doors in front & within the fire place there is a moveable grate as large as the fire place, which grate can be raised or lowered, and on which grate the fuel should be placed, the front doors can be thrown open exposing the fire to view in the same manner as in a common Franklin Stove. 3d Over the fire and near the top plate of the stove there is a fixed horizontal plate as large as the fire place which plate contains two orifices corresponding in size and position to the two orifices in the top plate hereafter mentioned The back edge of this fixed horizontal plate lies a little above the front edge of the top plate of the oven, leaving a space between the two which may be opened or shut by a damper extending the whole width of the stove, This damper is wide enough to close the space between the two plates when the damper is raised. When the

9115X damper is down it rests upon the top plate of the oven, and it is moved by a handle on the outside of the stove. 4th. Between the fixed horizontal plate and the top plate of the stove and between the two orifices are placed two swing dampers which are made a little narrower than the space between said horizontal and top plate, and the dampers are made so long that in turning each damper will reach the front or the side of the stove according to its position 5th. The top plate consists of three parts besides the coverings to the orifices, first a horizontal rim resting upon the upper edge of the sides and ends of the stove, On the back end of this rim is an oval funnel to convey of the smoke, and on which funnel the pipe rests. Secondly, two moveable plates, resting on this rim, which plates with the rim cover the whole top surface, in the front plate of these two plates are two orifices directly over the fire, the diameter of each of which is equal to the depth of the fire place, and these two orifices are directly over the Orifices in the fixed horizontal plate in the back plate of these two moveable plates, is one orifice larger than either of the orifices in the front plate. The front of these two plates may be taken up and the back plate slid forward so as to bring the large orifice directly over the fire, and then the plate containing the two orifices put in back of the other, and thus these two moveable plates can be changed from front to back according to the wishes of the person using the stove, The orifices in these two moveable plates, are to receive vessels used in cooking. and the orifices are covered either with lids or rings of different sizes 6th. There are two swing dampers between the top plate of the stove and the top plate of the oven, they are hung near the side of the stove and a little back of the centre of the larger orifice. The dampers extend back from the place where they are hung they are made a little narrower than the space between the top plate of the stove and the top plate of the oven, and are made so long that when swung toward each other they will nearly meet at the back edge of the back orifice 7th. The dampers turn on pivots, and there are handles to the dampers on the outside of the stove, that end of the handle which points in the direction in which the damper moves is made long to shew the position of the damper 8th. There are doors on the side of the oven & small doors on the side of the fire place. 9th. Within a stove pipe made in the common form there is another smaller pipe, the bottom of which smaller pipe may pass out of the bottom of the stove or at the bottom or side of the larger pipe – and the top of this small pipe comes out of the larger pipe, either at its top or side, thus leaving both ends of the smaller pipe open. ~~

10th Also a ventilator made of sheet iron or any other thin metal for the purpose of conveying off the steam when cooking. It is made concave, on the lower side, and spreads out over the orifices in the top plate of the stove, There is at-tached to the upper point of the ventilator and rising from it a folding pipe and from the upper ends it leads in a horizontal direction into the stove pipe within the horizontal part of this pipe is a damper. The Ventilator & pipe may be raised by one or more pullies fastened to the wall or ceiling over head and when not needed to carry off the steam may be raised and kept in its position by weights when raised the different joints of the folding pipe slide into each other. ~~

11th I further state that those parts of this stove, which I claim as my own invention, and on which alone I claim Letters Patent, are the following to wit. the fixed horizontal plate over the fire containing two orifices corresponding in size and position to the two orifices in the top plate together with the two swing dampers over that plate, another damper which shuts the space between said fixed plate and the upper plate of the oven and also the two swing dampers between the top plate of the stove and the top plate of the oven. Also the rim and two moveable plates forming the top of the stove, and the invention above described for changing the places of the moveable plates, also the smaller pipe open at both ends, passing through the common stove pipe, and the ventilator for carrying off the steam. These things I claim as my invention, and for these only do I claim Letters Patent of the United States -

Ezkl. Daball.

Witnesses
L. R. Woodbridge
H. H. Woodbridge (Patented 26 Sept. 1835)

Exd
Ch. J. W.

1360 [illegible]

(Drawing)